US007608551B2

(12) United States Patent
Margaryan et al.

(10) Patent No.: US 7,608,551 B2
(45) Date of Patent: Oct. 27, 2009

(54) BISMUTH CONTAINING FLUOROPHOSPHATE GLASS AND METHOD FOR MAKING THEREOF

(76) Inventors: Alfred A. Margaryan, 370 W. Pioneer Dr., Apt. #107, Glendale, CA (US) 91203; Ashot A. Margaryan, 370 W. Pioneer Dr., Apt. #206, Glendale, CA (US) 91203

( * ) Notice: Subject to any disclaimer, the term of this patent is extended or adjusted under 35 U.S.C. 154(b) by 693 days.

(21) Appl. No.: 11/174,862

(22) Filed: Jul. 5, 2005

(65) Prior Publication Data

US 2007/0010390 A1 Jan. 11, 2007

(51) Int. Cl.
*C03C 3/247* (2006.01)
*C03C 3/16* (2006.01)
*C03C 3/17* (2006.01)
(52) U.S. Cl. .............................. 501/44; 501/45; 501/48
(58) Field of Classification Search .................. 501/44, 501/45
See application file for complete search history.

(56) References Cited

U.S. PATENT DOCUMENTS

| | | | | |
|---|---|---|---|---|
| 2,430,539 | A | 11/1947 | Kuan-Han Sun ............. | 106/47 |
| 2,481,700 | A | 9/1949 | Kuan-Han Sun et al. ...... | 106/47 |
| 2,511,225 | A | 6/1950 | Kuan-Han Sun ............. | 106/47 |
| 2,511,227 | A | 6/1950 | Kuan-Han Sun ............. | 106/47 |
| 3,846,142 | A | 11/1974 | Buzhinsky et al. ............ | 106/47 |
| 4,040,846 | A * | 8/1977 | Broemer et al. ............... | 501/42 |
| 4,120,814 | A | 10/1978 | Izumitani et al. ....... | 252/301.4 P |
| 4,386,163 | A * | 5/1983 | Kodama ........................ | 501/44 |
| 4,771,020 | A | 9/1988 | Omata et al. .................. | 501/42 |
| 4,962,067 | A | 10/1990 | Myers .......................... | 501/45 |
| 5,068,209 | A * | 11/1991 | Meinert et al. ................ | 501/30 |
| 5,755,998 | A | 5/1998 | Yamazaki et al. ..... | 525/301.4 P |
| 6,429,162 | B1 | 8/2002 | Prassas ......................... | 501/44 |
| 6,430,349 | B1 | 8/2002 | Hyden et al. ................. | 385/132 |
| 6,495,481 | B1 | 12/2002 | Margaryan ................... | 201/44 |
| 7,088,903 | B2 * | 8/2006 | Ishioka ........................ | 385/147 |
| 2003/0040421 | A1 * | 2/2003 | Margaryan ................... | 501/44 |
| 2005/0058424 | A1 * | 3/2005 | Ishioka ........................ | 385/147 |

OTHER PUBLICATIONS

"The Bismuth Atom Neighborhood in Bismuth Silicate Glasses From X-Ray Absorption Experiment," by Agniezka Witkowska et al., 6th International Conference on Intermolecular Interaction In Matter, Gdansk- Poland, Sep. 10-13, 2001.
"Ultrafast Optical Switch and Wavelength Division Multiplexing (WDM) Amplifiers Based on Bismuth Oxide Glasses", by Naoki Sugimoto, Research Center, Asahi Glass Co., Ltd., Yokohama 221—8755, vol. 85 No. 5, May 2002 Japan.
"Spectroscopic properties of Mn2+ in new bismuth and lead contained fluorophosphates glasses," by A. Margaryan et al., published in Applied Physics, B78, 409-413 (2004).
"Erbium—doped potassium bismuth gallate glass," Wong et al., vol. 19, Issue 8, 1839- 1843, Aug. 2002, by S. Q. Man et al., Optics Infobase, published by OSA.
"Emission properties of PbO- Bi2O3-Ga2O3-Ge2O2 glasses doped with Tm3+ and Ho3+," Jay Hyok Song et al., Photonic Glass Laboratory, Department of Material Science and Engineering, Pohang University of Science and Technology, San 31, Hyoja- dong, Nam-gu, Pohang, Gyeongbuk 790-784, Republic of Korea, Journal of Applied Physics- Jun. 15, 2003, vol. 93, Issue 12, pp. 9441-9445.
Optical Engineering, vol. 6, Optical Materials, An Introduction to Selection and Application, Soloman Musikant, pp. 40 to 45, May 22, 1985.
"Physical Properties of Novel Lead Bismuthate Glasses with Large Transmitting Windows", Sun Hong Tao et la., Shanghai Institute of Optics and Fine Mechanics, Chinese Academy of Sciences, Shanghai 201800, 2004 Chinese Physics. Lett. 21 1759-1761.
"Ligands and Modifiers in Vitreous Materials, Spectroscopy of Condensed Systems," Alfred A. Margaryan, World Scientific Pub. Inc., 1999, pp. 33-135.
"Spectroscopy of Activated Fluoroberyllate Glasses," Alfred A. Margaryan and Manvel G. Manvelyan, Hayastan Press, Yerevan, 1974, pp. 15-113.
Nuclear and Space Radiation Effects on Materials (NASA Space Vehicle Design Criteria), NASA SP-8053, 1970.
"New Technique to Apply Optical Fiber Image Guide to Nuclear Facilities," Atsushi Kimura, Eiji Takada, Yoneichi Hosono, Masaharu Nakazawa, Hiroyuki Takahashi and Hiroyuki Haymi, Journal of Nuclear Science and Technology, vol. 39, No. 6, pp. 603-607, 2002.
"Radiation Effects Dataon Commercially Available Optical Fiber: Database Summary," Melanie N. Ott, Sigma Research and Engineering, Code 562, NASA Goddard Space Flight Center, Greenbelt, Maryland, USA.
"Application of General Purpose Fiber Optic Data Links to Radiation Measurements," Eiji Takada and Toshimitsu Komatsu, Journal of Nuclear Science and Technology, vol. 40, No. 6, pp. 363 to 369, 2003.
"Gamm-Radiation Resistant Fabry-Perot Fiber Optic Sensors," Hanying Liu, Don W. Miller and Joseph Talnagi, Review of Scientific Instruments, vol. 73, No. 8, 2002.
"Radiation Damage," Stefania Baccaro, (Italian National Agency for New Technology, Engergy and the Environment, Advanced Physics Technologies), Submitted to World Scientific, Feb. 13, 2002.
"Dopant and concentration dependence of linear and nonlinear refractive index and dispersion for new (Mg, Ba) F2 based Fluorophosphate Glasses," Ju H. Choi, Frank G. Shi, Alfred A. Margaryan, Ashot A. Margaryan, T. G. Nieh, Proc. SPIE, 4970, 82-88, (2003).

(Continued)

*Primary Examiner*—Karl E Group
*Assistant Examiner*—Elizabeth A Bolden
(74) *Attorney, Agent, or Firm*—Peter Ganjian

(57) ABSTRACT

New and improved compositions of doped and co-doped bismuth fluorophosphate glasses for lasers is disclosed that have a high refractive index (nD) of approximately 1.6 and higher, high transmission in the near infrared part of the spectrum, and a wide glass forming domain. The disclosed glass systems $Al(PO_3)_3$—$Ba(PO_3)_2$—$Bi(PO_3)_3$—$BaF_2$+$RF_x$+dopands use dopants from the group of oxides and or fluorides of rare earth elements Nd, Er, Yb, Tm, Tb, Ho, Sm, Eu and Pr as well as MnO and mixtures thereof over 100 percent (wt %) of the glass-base composition. These glasses have high chemical durability, radiation resistance, efficiency of laser use in the infrared and blue spectrum, and improved duration of luminescence.

13 Claims, No Drawings

OTHER PUBLICATIONS

"EXAFS spectroscopic study of PbO-Bi2O3-Ga2O3 glasses," Yong Gyu Choi et al., Journal of Non-Crystalline Solids, 259 (1999)—Abstract.

"Spectroscopic properties and thermal stability of erbium-doped bismuth-based glass for optical amplifier," Jianhu Yan et al., Shanghai Institute of Optics & fine Mechanics, Chinese Academy of Science, Shanghai 201800, China, Journal of Applied Physics, Jan. 15, 2003, vol. 93, Issue 2, Abstract.

PCT/US2006/026169; PCT Pub No. WO 2007/005953; Publications, Including International Search Report, International Written Opinion—from www.wipo.int.

Publication: Alfred Margaryan;"Fluorophosphate Vitreous Systems;" World Scientific; Singapore, N.J., London, Honk Hong 1999.

Physics and Chemistry of Rare-Earth Ions Doped Glasses; Editors: Nandyala Sooraj Hussain & Jose Domingos Da Silva Santos; vols. 48- 47;2008; Chapter 2; http://www.aforesearch.com/scientificpublication.html.

Dependence of thermo-mechanical and mechanical properties of novel fluorophosphate glass on various rare earth dopants, Journal of Materials Science vol. 43, No. 3, 2008, pp. 1109-1113; http://www.aforesearch.com/scientificpublication.html http://www.aforesearch.com/scientificpublication.html.

Novel alkaline-free Er3+-doped fluorophosphate glasses for broadband optical fiber lasers and amplifiers; Journal of Alloys and Compounds, vol. 450, Issues 1-2, 2008, pp. 540-545 http://www.aforesearch.comiscientificpublication.html.

Fluorescence and Nonradiative Properties of Nd3+ in Novel Heavy Metal Contained Fluorophosphate Glass; Advances in OptsElectronics vol. 2007 (2007), Article ID 39892, 8 pages doi:10.115512007/39892 http://www.aforesearch.com/scientificpublication.html.

Rare Earth Doped Photonic Glass Materials for the Miniaturization and Integration of Optoelectronic Devices; From 39th International Symposium on Microelectronics, Oct. 8-12, 2006 San Diego, California, USA http://www.aforesearch.com/scientificpublication.html.

Optical absorption and emission properties of Nd3+ doped fluorophosphates glass for broadband fiber amplifier applications; From Photonics West, Jan. 25-31, 2003, San Jose California, USA. http://www.aforesearch.corn/scientificpublication.html.

Spectral properties of Nd 3+ ion in new fluorophosphates glasses: Judd-Ofett intensity parameters; From Photonics West, Jan. 25-31, 2003, San Jose California, USA. http://www.aforesearch.com/scientificpublication.html.

Novel Broadband and Eye-safe Laser Source Materials: Alkaline-free Yb3+ doped Fluoro phosphate Glasses for Fiber and Waveguade Lasers P4. Yb3+ doped Fluorophosphate glasses for fiber and waveguide lasers; From "The International Symposium On Photonic Glasses" Abstract Oct. 14-17, 2002 Shanghai, P.R. China http://www.aforesearch.com/scientificpublication.html.

Refractive index and low dispersion properties of new fluorophosphate glasses highly doped with rare-earth ions; Journal of Materials Research, Jan. 2005 - vol. 20, No. 1, pp. 264-270 http://www.aforesearch.com/scientificpublication.html.

Optical transition properties of Yb3+ in new fluorophosphate glasses with high gain coefficient; Journal of Alloys and Compounds 2005 - vol. 396, Issue 1-2, pp. 79-85 http://www.aforesearch.com/scientificpublication.html.

Judd-Ofelt analysis of spectroscopic properties of Nd3+-doped novel fluorophosphate glass; Journal of Luminescence, Sep. 2005 - vol. 114, Issues 3-4, pp. 167-177 http://www.aforesearch.comiscientificpublicalion.html.

Spectroscopic properties of Yb3+ in heavy metal contained fluorophosphate glasses; Materials Research Bulletin Dec. 2005 - vol. 40, Issue 12, pp. 2189-2197 http://www.aforesearch.comiscientificpublication.html.

\* cited by examiner

BISMUTH CONTAINING FLUOROPHOSPHATE GLASS AND METHOD FOR MAKING THEREOF

BACKGROUND OF THE INVENTION (1) Field of the Invention

This invention relates to doped fluorophosphate optical grade glasses and, more particularly, to bismuth containing doped/co-doped fluorophosphate optical grade glasses.

(2) Description of Related Art

Most conventional optical grade glasses are manufactured on a $SiO_2$ base, and are appropriately doped to form silicate laser glasses. The optical grade $SiO_2$ doped glasses have a limited refractive index of about nD=1.40 to 1.45, which limit their infrared transmission spectrum, and have a high dispersion rate of approximately 45 to 50. These limitations prohibit the use of $SiO_2$ based optical glasses in the newer laser applications that require efficient transparency in the near and mid infrared frequency range. In general, the $SiO_2$ based glasses have a maximum infrared transmission of about 2.5 µm to 3.0 µm. A further limitation with $SiO_2$ based optical grade glasses is that they also have a low Gamma and Neutron radiation resistance. The $SiO_2$ base optical grade glasses darken under Gamma and Neutron radiation due to their low Gamma radiation resistance—a process known as solarization, making them impractical for uses in the space and nuclear applications.

Other optical grade glass systems include the phosphate based glasses of varying compositions, disclosed in U.S. Pat. Nos. 3,846,142; 4,962,067; 6,430,349; and 4,771,020. However, these glasses contain alkaline elemets. In general, glasses containing alkaline elements have low hardness, and low chemical durability or stability, none of which are suitable properties appropriate for use in newer laser applications.

Still other optical grade glass systems incude fluorophosphate based glasses of varying compositions. In general, known fluorophosphate optical grade glasses have a refractive index of approximately nD=1.55 to 1.59 and a low dispersion of approximately 50 to 68. However, none provide the efficient transmission qualities in the near and mid infrared frequency range required for newer laser applications.

Existing fluorophosphate optical grade glasses such as the system $BaPO_3F$—$MgF_2$—$Nd_2O_3$—$Ga_2O_3$—$MnO$ have a high rate of inactive absorption of wavelength 1,064 nm, which reduces the luminescence of glass dopants. The inactive absorption may be defined as optical "noise." There are also a class of fluorophosphate laser glasses that were developed on a metaphosphate aluminum and fluorides of metals from the first and second group of the periodic elements (2,511,225; 2,511,227; 2,481,700; and 2,430,539). However, the refractive index for these glasses are in the range (nD) from about 1.45 to 1.59, which are not very high.

U.S. Pat. Nos. 6,429,162; 4,120,814; 4,771,020; and 5,755,998 disclosed various fluorophosphate optical grade glasses that include alkaline elements that inherently have limited chemical durability, laser performance, and reduced Gamma and Neutron radiation resistance, making their application in space and nuclear energy industries impractical.

The U.S. patent application 20030040421 to Margaryan disclosed a fluorophosphate glass system that is based on only two raw compounds used for glass formations, the metaphosphates of Baruim $Ba(PO_3)_2$ and Aluminum $Al(PO_3)_3$. However, the use of only two raw compounds for glass formations limits the glass-forming domain (i.e., limiting the number of permutations for the glass formations (or types) that can be produced). In addition, the glass systems that are disclosed in the U.S. patent application 20030040421 have insufficient laser performance and Gamma and Neutron radiation resistance. The glass systems disclosed used single anti-radiation element barium (Ba), with an ytterbium element as a dopant that functions to create a constant process similar to di-solarization.

Other glass systems include those taught by the U.S. Pat. No. 6,495,481 to Margaryan, the entire dislosure of which is incorporated herein by this reference. The U.S. Pat. No. 6,495,481 to Margaryan disclosed germanium-fluorophosphate glass systems with network structure based on germanium dioxide. However, the germanium dioxide based network strcutures are not suitable for radiation resistance applications due to the presence of $GeO_2$.

There are several publications that discuss compositions of bismuth containing glasses. The publication titled "The Bismuth Atom Neighborhood in Bismuth Silicate Glasses From X-Ray Absorption Experiment," by Agniezka Witkowska et al., 6$^{th}$ International Conference on Intermolecular Interaction In Matter, Gdansk-Poland, Sep. 10-13, 2001 investigated the structure of bismuth containing silicate glasses using X-Ray absorption experiment.

The publication titled "Ultrafast Optical Switch and Wavelength Division Multiplexing (WDM) Amplifiers Based on Bismuth Oxide Glasses," by Naoki Sugimoto, Research Center, Asahi Glass Co., Ltd., Yokohama 221-8755, Vol. 85 No. 5, May 2002 Japan, disclosed a Bismuth Oxide based optical switching system. However, as with other $SiO_2$ based system, in general, these glasses cannot be used in space and nuclear energy industries due to their low Gamma and Neutron radiation resistance.

The publication titled "Spectroscopic properties of $Mn^{2+}$ in new bismuth and lead contained fluorophosphates glasses," by A. Margaryan et al., published in Applied Physics, B78, 409-413 (2004) disclosed a glass system with no dopants (with the exception of $Mn^{2+}$). The glasses taught in this publication could not be used for laser applications, nor can they be used in space and nuclear energy industries due to lack of dopants that improve radiation resistance in glass.

The publication titled "Erbium—doped potassium bismuth gallate glass," by Wong et al., Journal of the Optical Society of America, (Optical Physics),Volume 19, Issue 8, 1839-1843, August 2002, disclosed potassium bismuth gallate glasses as suitable hosts for rare-earth-ion erbium ($Er^{3+}$) operating in the 1.55 micrometer wavelength region. However, due to the use of potassium, these glass systems have a very low chemical stability and durability, and in general, could not be used in space and nuclear energy industries due to their low Gamma and Neutron radiation resistance.

The publication titled "Emission properties of PbO—$Bi_2O_3$—$Ga_2O_3$—$GeO_2$ glasses doped with $Tm^{3+}$ and $Ho^{3+}$," by Jay Hyok Song et al., Journal of Applied Physics, Jun. 15, 2003, Volume 83, Issue 12, pp. 9441-9445 disclosed the use of $GeO_2$ having low chemical durability within the disclosed glass system.

The publication titled "Physical Properties of Novel Lead Bismuthate Glasses with Large Transmitting Windows," by Sun Hong Tao et la., Shanghai Institute of Optics and Fine Mechanics, Chinese Academy of Sciences, Shanghai 201800, 2004 Chinese Physics. Lett. 21 1759-1761, disclosed a Pb based glass system, which impedes its use in space and nuclear energy industries, in particular, in a high Gamma and Neutron radiation environment.

Other materials such as optical crystals rather than optical glasses are also available. However, optical crystals (crystalline material in general) offer many disadvantages in terms of manufacture, yield (amount of raw material needed to produce the desired amount of crystalline product), and variation in optical characteristics, etc. For example, in general, the composition of glasses may easily be varied to produce different optical characteristics; this cannot be easily accomplished with crystals. Furthermore, crystal growth is slow, requires the applications of complex technologies, and is costly to produce.

In light of the current state of the art and the drawbacks to current devices, a need exists for a glass that would have a high refractive index, wider infrared transmission spectrum, high thermal expansion, high hardness properties, high chemical durability or stability, low dispersion, high level of luminescence, and low rate of inactive absorption (low rate of optical noise) for a more efficient transparency in a wide frequency range from ultraviolet to infrared. In addition, in order to use the glass in space and nuclear energy industries a need exists for a glass that would also have a high Gamma and Neutron radiation resistance.

BRIEF SUMMARY OF THE INVENTION

The present invention provides bismuth fluorophosphate glass compositions, non-limiting exemplary uses of which may include laser applications, amplifiers, radiation resistant windows and fibers, high density optical storage, etc. Due to their unique spectroscopic properties, the bismuth fluorophosphate vitreous materials can be used for ultraviolet, visual, and near infrared optics in the exemplary band of about 250 to 3,500 nm.

The bismuth fluorophosphate glass of the present invention contains a combination of the components $Al(PO_3)_3$, $Ba(PO_3)_2$, and $Bi(PO_3)_3$, which constitute the glass formation of the present invention. The addition of $BaF_2$ to the glass formation comprises the glass-base of the present invention. An alternative glass-base may also be comprised of $BaF_2$+ RFx, where RFx is selected from the group consisting of preferably $MgF_2$, $CaF_2$, $PbF_2$, and $BiF_3$, or related fluorides to form the alternative glass-base of the present invention. In addition, optional dopants/co-dopants MnO and or $M_2O_3$ and or $MF_3$, where M is selected from the group consisting of Nd, Er, Tm, Ho, Pr, Th, Sm, Eu, and Yb over 100 wt. % of the glass-base may be used to compose an optical grade glass in accordance with the present invention.

In other words, a combination of the components $Al(PO_3)_3$, $Ba(PO_3)_2$, and $Bi(PO_3)_3$ constitute a ternate glass formation in accordance with the present invention. The addition of $BaF_2$ to the ternary glass formation constitutes the glass-base of the present invention ({Glass Formation}+ {$BaF_2$}). Optionally, in addition to $BaF_2$, RFx may also be added to the glass-base to form an alternative glass-base ({Glass Formation}+{$BaF_2$+(optional) RFx}). The RFx is selected from the group consisting of preferably $MgF_2$, $CaF_2$, $PbF_2$, and $BiF_3$, or related fluorides. With the optional addition of dopants/co-dopants MnO and/or $M_2O_3$ and/or $MF_3$ over 100 wt. percent of the glass-base ({Glass Formation}+ {$BaF_2$+(optional) RFx}), the optical grade glass of the present invention is composed, with the M is selected from the group consisting of Nd, Er, Tm, Ho, Pr, Th, Sm, Eu, and Yb. The disclosed composition of the glasses of the present invention have a high level of chemical durability, laser efficiency, luminescence energy, Gamma and Neutron radiation resistance, and superior optical characteristics suitable for high density optical storage.

These and other features, aspects, and advantages of the invention will be apparent to those skilled in the art from the following detailed description of preferred non-limiting exemplary embodiments, taken together with the claims that follow.

BRIEF DESCRIPTION OF THE DRAWINGS

There are no drawings.

DETAILED DESCRIPTION OF THE INVENTION

The present invention provides glass compositions that are particularly useful in laser glass, amplifiers, radiation resistant windows and fibers, high density optical storage applications, and more. The glass composition of the present invention provide superior optical characteristics with a refractive index from about 1.63 to 1.65 and a dispersion from about 67 to 68. The non-silicate base glass of the present invention is also highly Gamma and Neutron radiation resistant. The new bismuth based fluorophosphate glasses have a better performance in Gamma radiation environment due to the unique characteristics of bismuth (Bi).

Generally, most of the fluorophosphate glasses are synthesized on the barium, aluminum, lead, calcium, stronicium, zinc, magnesium, or sodium metaphosphate bases. Creation of glasses that can perform in harsh Gamma radiation environment requires a proper selection of the right type of modifiers elements. Although fluorophosphate glasses contiaining barium (Ba) or lead (Pb) are excellent candidates for creation of radiation resistance vitreous material, due to the environmental issues it has been determined that lead (PB) containing glasses may cause problems after they are exposed to high levels of Gamma radiation. In accordance with the present invention, the best and better replacement for lead (Pb) in radiation resistance glasses is bismuth (Bi).

In addition to bismuth (Bi), the glass system of the present invention further includes barium (Ba) and aluminum (Al). The presence of two antiradiation modifiers atoms (bismuth and barium) substantially increases the Gamma radiation resistance. To further enhance the performance, rare earth elements, a nonlimiting example of which is ytterbium (Yb) can be added as an optional dopant to the base compositions of the glass of the present invention. Ytterbium dopant increases the Gamma and Neutron radiation resistance and improves the optical characteristics of the glass systems of the present invention in terms of higher refractive index, high durability, and high visible transparency that is critical for making a glass fiber. The ytterbium dopant increases the radiation resistance of the glass of the present invention in accordance with the following chemical process or transformations at the exemplary wavelength of about (333 nm):

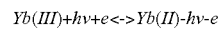

$Yb(III)+hv+e <-> Yb(II)-hv-e$

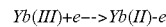

$Yb(III)+e --> Yb(II)-e$

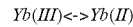

$Yb(III) <-> Yb(II)$ where hv is energy of the Gamma ray, and e is the electron. The super-fast transformation or oscillations of Yb valency from (III) to (II) and reverse creates a constant process similar to disolarization that allows the ternate glass matrix of the present invention to stay transparent during Gamma radiation. Nonlimiting examples of other rare earth elements in small amounts (e.g., 0.02 to 0.05 mol %) that withstood high levels of irradiation include Samarium (Sm(III)<->Sm(II)) at the exemplary wavelength range of about 280-360 nm) and Europium (Eu(III<->Eu(II)) at the exemplary wavelength of about 310 nm).

The bismuth containing fluorophosphate glass of the present invention can be classified with a "CR1" class rating for high chemical durability. The chemical durability (or climatic resistance) classification "CR1" of the composition of the presnt invention is based on the Schott Glass classification scheme. The Schott Glass categorizes climatic resistances of various glasses (their chemical durability) into four classes from CR1 to CR4, with CR1 representing a high climatic resistance for a glass when exposed to 100% relative humidity in air, thermally cycled between 45° C. to 55° C. each hour. The chemical durability for the bismuth fluorophosphate glass of the present invention meets the requirements of the Schott Glass CR1 classification scheme. This classification scheme is published in Optical Engineering, Volume 6, pages 40-45, titled "Optical Materials An Introduction to Selection and Application," 1985, by Solomon Musikant.

Fluorophosphate based glasses are close to the phosphate glasses in terms of the degree of covalence of the dopant-ligand bond. This has been confirmed by comparison of the Racha coefficient, B, for these glasses. The magnitude of B decreases with a decrease in size of the effective nuclear charge of free ions. The boundary of glass formation and glass-base for fluorophosphate glasses with metaphosphate of barium, metaphosphate of bismuth, metaphosphate of aluminum and with fluorides of earth alkaline elements create a wide domain of glass forming fluorophosphate that increase in the following order Ba>Sr>Ca>Mg. The presence of barium fluoride, $BaF_2$, with the added optional RFx, where RFx is selected from the group consisting of $MgF_2$, $CaF_2$, $PbF_2$, and $BiF_3$ effectively increases and improves chemical durability, Gamma radiation resistance, and laser characteristics The bismuth fluorophosphate glass of the present invention contains a combination of the components $Al(PO_3)_3$, $Ba(PO_3)_2$, and $Bi(PO_3)_3$, which constitute the glass formation of the present invention. The addition of $BaF_2$ to the glass formation comprises the glass-base of the present invention. An alternative glass-base may also be comprised of $BaF_2$+RFx, where RFx is selected from the group consisting of preferably $MgF_2$, $CaF_2$, $PbF_2$, and $BiF_3$, or related fluorides to form the alternative glass-base of the present invention. In addition, optional dopants/co-dopants MnO and or $M_2O_3$ and or $MF_3$, where M is selected from the group consisting of Nd, Er, Tm, Ho, Pr, Tb, Sm, Eu, and Yb over 100 wt. % of the glass-base may be used to compose an optical grade glass in accordance with the present invention.

In other words, a combination of the components $Al(PO_3)_3$, $Ba(PO_3)_2$, and $Bi(PO_3)_3$ constitute a ternate glass formation in accordance with the present invention. That is, ternary raw compounds used for the glass formation of the present invention are Metaphosphates of Aluminum $Al(PO_3)_3$, Barium $Ba(PO_3)_2$, and Bismuth, $Bi(PO_3)_3$, which are considered chemically stable substances. The use of three raw compounds for glass formations increases the glass-forming domain (i.e., the number of permutations for the glass formations (or types) that can be produced). The addition of $BaF_2$ to the ternary glass formation constitutes the glass-base of the present invention ({Glass Formation}+{$BaF_2$}). Optionally, in addition to $BaF_2$, RFx may also be added to the glass-base to form an alternative glass-base ({Glass Formation}+{$BaF_2$+(optional)RFx}). The RFx is selected from the group consisting of preferably $MgF_2$, $CaF_2$, $PbF_2$, and $BiF_3$, or related fluorides. With the optional addition of dopants/co-dopants MnO and/or $M_2O_3$ and/or $MF_3$ over 100 wt. percent of the glass-base ({Glass Formation}+{$BaF_2$+(optional) RFx}), the optical grade glass of the present invention is composed, with the M is selected from the group consisting of Nd, Er, Tm, Ho, Pr, Th, Sm, Eu, and Yb. The disclosed composition of the glasses of the present invention have a high level of chemical durability, high laser efficiency, high luminescence energy, high gamma radiation resistance, and superior optical characteristics suitable for high density optical storage.

Table I below details twenty-one (21) exemplary sample ranges for the composition of the ternary glass formation components {$Bi(PO_3)_3$, $Al(PO_3)_3$, and $Ba(PO_3)_2$} and the combining of the fluorides {$BaF_2$+(optional) RFx} with the glass formations to form the glass-base (1), $$\{Bi(PO_3)_3, Al(PO_3)_3, \text{ and } Ba(PO_3)_2\}+\{BaF_2+\text{(optional) } RFx\}=100 \text{ Mol \%}, \quad (1)$$

plus the optional addition of dopants/codopants (2) to form the bismuth fluorophosphate glass of the present invention, $$\{\text{Glass-Base}\}(100 \text{ Mol \%})+\{\text{Optional Dopants/Co-dopants}\}(\text{wt \%}). \quad (2)$$

TABLE I

| {$Bi(PO_3)_3$, $Al(PO_3)_3$, and $Ba(PO_3)_2$} in Mol %: (Glass Formations) | | | + {$BaF_2$ + (optional) RFx} in Mol % (Glass-Base) | | | + {Optional Dopants/Co-dopants $M_2O_3$ and/or $MF_3$ over 100 wt percent of Glass-Base} | | |
|---|---|---|---|---|---|---|---|---|
| Preferred | Most Preferred | Especially Preferred | Preferred | Most Preferred | Especially Preferred | Preferred | Most Preferred | Especially Preferred |
| $Bi(PO_3)_3$ 16-94 $Al(PO_3)_3$ 4.5-5 $Ba(PO_3)_2$ 0.5-5 | $Bi(PO_3)_3$ 19-80 $Al(PO_3)_3$ 1-5 $Ba(PO_3)_2$ 1-5 | $Bi(PO_3)_3$ 9-14 $Al(PO_3)_3$ 1-5 $Ba(PO_3)_2$ 11-16 | 0.5-79 | 10-79 | 65-79 | 0.1-20 | 2-7 | 2.5 |
| $Bi(PO_3)_3$ 0.5-79 $Al(PO_3)_3$ 10.5-11 $Ba(PO_3)_2$ 10-10.5 | $Bi(PO_3)_3$ 4.547 $Al(PO_3)_3$ 16-35 $Ba(PO_3)_2$ 0.5-5 | $Bi(PO_3)_3$ 5-10 $Al(PO_3)_3$ 5-10 $Ba(PO_3)_2$ 11-16 | 0.5-79 | 13-79 | 64-79 | 0.1-20 | 6-15 | 1.5 |
| $Bi(PO_3)_3$ 7-35 $Al(PO_3)_3$ 7-35 $Ba(PO_3)_2$ 7-29.5 | $Bi(PO_3)_3$ 5-30 $Al(PO_3)_3$ 10-40 $Ba(PO_3)_2$ 6-29 | $Bi(PO_3)_3$ 9-14 $Al(PO_3)_3$ 6-11 $Ba(PO_3)_2$ 6-11 | 0.5-79 | 1-79 | 64-79 | 0.1-20 | 1-3 | 5 |
| $Bi(PO_3)_3$ 4-5 $Al(PO_3)_3$ 16.5-94 $Ba(PO_3)_2$ 0.5-5 | $Bi(PO_3)_3$ 1-15 $Al(PO_3)_3$ 15-50 $Ba(PO_3)_2$ 18-25 | $Bi(PO_3)_3$ 6-11 $Al(PO_3)_3$ 10-15 $Ba(PO_3)_2$ 5-11 | 0.5-79 | 10-66 | 63-79 | 0.1-20 | 6-15 | 7.5 |
| $Bi(PO_3)_3$ 10.5-11 $Al(PO_3)_3$ 5.5-78 $Ba(PO_3)_2$ 10-10.5 | $Bi(PO_3)_3$ 5-10 $Al(PO_3)_3$ 7-40 $Ba(PO_3)_2$ 9-45 | $Bi(PO_3)_3$ 8-13 $Al(PO_3)_3$ 5-10 $Ba(PO_3)_2$ 8-13 | 0.5-79 | 5-79 | 64-79 | 0.1-20 | 1-10 | 1-3.5 |

TABLE I-continued

| | {Bi(PO$_3$)$_3$, Al(PO$_3$)$_3$, and Ba(PO$_3$)$_2$} in Mol %: (Glass Formations) | | | + {BaF$_2$ + (optional) RFx} in Mol % (Glass-Base) | | | + {Optional Dopants/Co-dopants M$_2$O$_3$ and/or MF$_3$ over 100 wt percent of Glass-Base) | | |
|---|---|---|---|---|---|---|---|---|---|
| Preferred | Most Preferred | Especially Preferred | Preferred | Most Preferred | Especially Preferred | Preferred | Most Preferred | Especially Preferred |
| Bi(PO$_3$)$_3$ 10-10.5 Al(PO$_3$)$_3$ 10.5-11 Ba(PO$_3$)$_2$ 0.5-78 | Bi(PO$_3$)$_3$ 5-10 Al(PO$_3$)$_3$ 15-60 Ba(PO$_3$)$_2$ 5-10 | Bi(PO$_3$)$_3$ 1-5 Al(PO$_3$)$_3$ 9-14 Ba(PO$_3$)$_2$ 11-16 | 0.5-79 | 20-65 | 65-79 | 0.1-20 | 4-60 | 3 |
| Bi(PO$_3$)$_3$ 4.5-5 Al(PO$_3$)$_3$ 0.5-5 Ba(PO$_3$)$_2$ 16-94 | Bi(PO$_3$)$_3$ 12-16 Al(PO$_3$)$_3$ 15-40 Ba(PO$_3$)$_2$ 3-30 | Bi(PO$_3$)$_3$ 15-16 Al(PO$_3$)$_3$ 5-10 Ba(PO$_3$)$_2$ 1-16 | 0.5-79 | 14-70 | 58-79 | 0.1-20 | 3-8 | 1.5 |

In particular, an exemplary, nonlimiting, especially preferred material for the present invention are glasses containing Al(PO$_3$)$_3$ of about 5 to 10 mol %, Ba(PO$_3$)$_2$ of about 8 to 13 mol %, and Bi(PO$_3$)$_3$ of about 8 to 13 mol %, which constitute a ternary glass formation of the present invention. The addition of BaF$_2$+(optional) RFx of about 64 to 79 mol % compose the base material (the glass-base), where the optional RFx is selected from the group consisting of MgF$_2$, CaF$_2$, PbF$_2$, and BiF$_3$. The addition of the optional dopants/codopants over 100 wt. % of the glass-base such as MnO and or M$_2$O$_3$ and or MF$_3$ of about 1 to 3.5 weight %, where M is selected from the group consisting of Nd, Er, Tm, Ho, Pr, Tb, Sm, Eu and Yb, will comprise the optical grade glass of the present invention.

For the glass compositions of the present invention, the duration of luminescence for neodymium ions in the laser wavelength of about 1064 nm is approximately 430 to 460 msec and the half width of luminescence is approximately 160 to 165 cm$^{-1}$. For erbium ions, the duration of luminescence for the glass composition of the present invention in the laser wavelength of about 1535 nm is approximately 490 to 510 msec and the half width of luminescence is approximately 150 to 155 cm$^{-1}$. The emission cross section for yetterbium was found to be about 0.87 pm$^2$ at the lasing wavelength of about 996 nm. This is a very high level among fluorophospate laser glasses. Most conventional fluorophosphate laser glasses have an emission cross section of about 0.68 pm$^2$ at the same wavelength of 996 nm. The glass composition of the present invention also exhibits an extremely high gain coefficient of about 0.95 ms-pm$^4$, and high quantum efficiency of about 94%. The combination of spectroscopic (high emission cross section and gain coefficient) and optical (low dispersion and small nonlinear refractive index) properties demonstrates that the glass compositions of the present invention, such as the current ytterbium activated bismuth fluorophosphate glass is an excellent candidate for fiber and waveguide lasers.

A neodymium, erbium, and yetterbium doped athermal bismuth fluorophosphate glass results from the high neodymium, erbium, and yetterbium oxide or fluoride concentration of about 4 to 6 weight %. Erbium doped bismuth fluorophosphate laser glass requires less excitation energy to emit light at the appropriate wavelength and therefore, more efficient than Erbium doped silicate glasses. In other words, the amount of energy required to excite the Erbium doped bismuth fluorophosphate glass is less than the energy needed to excite erbium doped silicate laser glass. Erbium doped bismuth fluorophosphate laser glass also has an eye safe operating wavelength of about 1535 nm, which makes it useful for specialized medical apparatus. The combination of the glass-base and dopands of the present invention provide an efficient laser glass in the infrared and blue region for laser use.

The preferred glass forming compounds of the present invention Al(PO$_3$)$_3$, Ba(PO$_3$)$_2$, and Bi(PO$_3$)$_3$ are characterized as chemically stable substances. When combined, they create a significant free and open volume structure due to the large ionic radii of barium and bismuth. The nonlimiting examples of barium and bismuth containing glass formations may include Ba(PO$_3$)$_2$ and Bi(PO$_3$)$_3$. The addition of BaF$_2$+ (optional) RFx (e.g., BiF$_3$) will constitute the glass-base and provide the additional advantage of a free and open volume structure for the glass composition of the present invention. This added free space allows the homogenous and regular distribution of dopant/codopant ions in the glass matrices, improving optical characteristics. In other words, the larger free volume provides a greater freedom for dopants/codopants to excite (more room to vibrate) when energized.

The presence of BaF$_2$+RFx effectively increases the chemical durability of the optical material. As described above, in the grouping of glasses according to chemical stability of non-silicate glasses relating to humidity or moisture, the glasses of the present invention are considered to be stable. During the melting process a chemical integration between Ba(PO$_3$)$_2$ and BaF$_2$ creates BaPO$_3$F, monofluorophosphate barium. The melting process is conducted in the temperature range of about 1150° C. to 1350° C. in vitreous carbon crucibles in a dry argon atmosphere for about 4 to 6 hours followed by an annealing temperature range of about 300° C. to 360° C. for about 8 to 15 hours. In the system of Al(PO$_3$)$_3$—Ba(PO$_3$)$_2$—Bi(PO$_3$)$_3$—BaF$_2$—RFx two separate glass forming ranges were discovered, both of which are illustrated in Table II.

TABLE II

| | Glass Formations | | Glass-Base |
|---|---|---|---|
| | Ba(PO$_3$)$_2$ + Al(PO$_3$)$_3$ | Bi(PO$_3$)$_3$ | BaF$_2$ + RFx |
| RANGE - I (in mol %) | 7-45 | 14-50 | 5-79 |
| RANGE - II (in mol %) | 16-45 | 5-10 | 45-79 |

Examples of effective compositions and properties of the bismuth fluorophosphate laser glass for the composition Al(PO$_3$)$_3$—Ba(PO$_3$)$_2$—Bi(PO$_3$)$_3$—BaF$_2$—RFx—Nd$_2$O$_3$ or Er$_2$O$_3$ are illustrated in Table III based on mol percent and dopands over 100 wt % of the glass-base.

TABLE III

| Composition of Glass (mol %) | | | Dopant (wt %) | | Refractive Index (nD) | Density (g/cm3) | Quantum Yield (%) luminescence |
|---|---|---|---|---|---|---|---|
| Ba(PO$_3$)$_2$ + Al(PO$_3$)$_3$ | Bi(PO$_3$)$_3$ | BaF$_2$ + RFx | Nd$_2$O$_3$ | Er$_2$O$_3$ | | | |
| 42 | 48 | 10 | 2 | — | 1.6434 | 3.38 | 47 |
| 35 | 15 | 50 | 2 | — | 1.6485 | 3.41 | 63 |
| 30 | 10 | 60 | 2 | — | 1.6501 | 3.45 | 67 |
| 10 | 20 | 70 | 2 | — | 1.6445 | 3.48 | 73 |
| 40 | 50 | 10 | — | 2 | 1.6386 | 3.38 | 55 |
| 35 | 15 | 50 | — | 2 | 1.6406 | 3.40 | 64 |
| 28 | 12 | 60 | — | 2 | 1.6485 | 3.48 | 70 |
| 10 | 20 | 70 | — | 2 | 1.6440 | 3.45 | 77 |

In the above table III example, MnO and Yb$_2$O$_3$ may be used as co-dopants.

While the invention has been described in detail and with reference to specific embodiments thereof, it will be apparent by those skilled in the art that various changes and modifications can be made therein without departing from the spirit and scope thereof.

What is claimed is:

1. A bismuth fluorophosphate glass formed from a composition comprising on a mol basis:
    a metaphosphate Al(PO$_3$)$_3$, from 5 to 10 percent;
    a metaphosphate Ba(PO$_3$)$_2$, from 8 to 13 percent;
    a metaphosphate Bi(PO$_3$)$_3$, from 8 to 13 percent;
    fluorides BaF$_2$+RFx, from 64 to 79 percent; and
    a rare earth dopant M$_2$O$_3$ or MF$_3$ over 100 wt %;
where
R is selected from the group consisting of Ca, Mg, Pb, and Bi;
x is an index representing an amount of fluoride (F) in the compound RFx; and
M is selected from the group consisting of Lanthanide series.

2. The bismuth fluorophosphate glass as set forth in claim 1, wherein the rare earth dopant M$_2$O$_3$ or MF$_3$ over 100 wt %, are at 0.5 to 20 wt percent, with M selected from the group consisting of:
    neodymium (Nd), erbium (Er), ytterbium (Yb), thulium (Tm), terbium (Tb), holmium (Ho), samarium (Sm), europium (Eu), praseodymium (Pr); and mixtures thereof.

3. A bismuth fluorophosphate glass formed from a composition comprising on a mol basis:
    a metaphosphate Al(PO$_3$)$_3$, from 4.5 to 5 percent;
    a metaphosphate Ba(PO$_3$)$_2$, from 0.5 to 5 percent;
    a metaphosphate Bi(PO$_3$)$_3$, from 16 to 94 percent;
    fluorides BaF$_2$+RFx, from 0.5 to 79 percent; and
    a dopant over 100 wt % comprised of M$_2$O$_3$ or MF$_3$ at 0.5 to 20 wt percent, with M selected from a group consisting of rare earth elements:
        neodymium (Nd), erbium (Er), ytterbium (Yb), thulium (Tm), terbium (Tb), holmium (Ho), samarium (Sm), europium (Eu), praseodymium (Pr); and mixtures thereof;
where
R is selected from the group consisting of Ca, Mg, Pb, and Bi; and
x is an index representing an amount of fluoride (F) in the compound RFx.

4. A bismuth fluorophosphate glass formed from a composition comprising on a mol basis:
    a metaphosphate Al(PO$_3$)$_3$, from 10.5 to 11 percent;
    a metaphosphate Ba(PO$_3$)$_2$, from 10 to 10.5 percent;
    a metaphosphate Bi(PO$_3$)$_3$, from 0.5 to 78 percent;
    fluorides BaF$_2$+RFx, from 0.5 to 79 percent; and
    dopant over 100 wt % comprised of M$_2$O$_3$ or MF$_3$ at 0.5 to 20 percent, with M selected from a group consisting of rare earth elements:
        neodymium (Nd), erbium (Er), ytterbium (Yb), thulium (Tm), terbium (Tb), holmium (Ho), samarium (Sm), europium (Eu), praseodymium (Pr); and mixtures thereof;
where
R is selected from the group consisting of Ca, Mg, Pb, and Bi; and
x is an index representing an amount of fluoride (F) in the compound RFx.

5. A bismuth fluorophosphate glass formed from a composition comprising on a mol basis:
    a metaphosphate Al(PO$_3$)$_3$, approximately 10.5 to 11 percent;
    a metaphosphate Ba(PO$_3$)$_2$, approximately 0.5 to 78 percent;
    a metaphosphate Bi(PO$_3$)$_3$, approximately 10 to 10.5 percent;
    fluorides BaF$_2$+RFx, approximately 0.5 to 79 percent; and
    dopant over 100%, comprised of approximately 2 to 5 wt percent of oxide of neodymium (Nd);
    where R is selected from the group consisting of Ca, Mg, Pb, and Bi; and
    x is an index representing an amount of fluoride (F) in the compound RFx.

6. A bismuth fluorophosphate glass formed from a composition comprising on a mol basis:
    a metaphosphate Al(PO$_3$)$_3$, approximately 0.5 to 5 percent;
    a metaphosphate Ba(PO$_3$)$_2$, approximately 16 to 94 percent;
    a metaphosphate Bi(PO$_3$)$_3$, approximately 4.5 to 5 percent;
    fluorides BaF$_2$+RFx, approximately 0.5 to 79 percent; and
    dopant over 100%, comprised of approximately 2 to 5 wt percent of oxide of erbium (Er);
    where R is selected from the group consisting of Ca, Mg, Pb, and Bi; and
    x is an index representing an amount of fluoride (F) in the compound RFx.

7. A bismuth fluorophosphate glass formed from a composition comprising on a mol basis:
    a metaphosphate Al(PO$_3$)$_3$, approximately 0.5 to 78 percent;
    a metaphosphate Ba(PO$_3$)$_2$, approximately 10 to 10.5 percent;
    a metaphosphate Bi(PO$_3$)$_3$, approximately 10.5 to 11 percent;

fluorides $BaF_2+RFx$ approximately 0.5 to 79 percent; and a dopant over 100%, approximately 0.5 to 5 wt percent comprised of $M_2O_3$ or $MF_3$, with M selected from a group consisting of rare earth elements:

neodymium (Nd), erbium (Er), ytterbium (Yb), thulium (Tm), terbium (Tb), holmium (Ho), samarium (Sm), europium (Eu), praseodymium (Pr); and mixtures thereof;

where R is selected from the group consisting of Ca, Mg, Pb, and Bi;

x is an index representing an amount of fluoride (F) in the compound RFx, forming fluorides selected from the group consisting of $CaF_2$, $MgF_2$, $PbF_2$, and $BiF_3$.

8. A bismuth fluorophosphate glass formed from a composition comprising on a mol basis:

a metaphosphate $Al(PO_3)_3$, approximately 16.5 to 94 percent;

a metaphosphate $Ba(PO_3)_2$, approximately 0.5 to 5 percent;

a metaphosphate $Bi(PO_3)_3$, approximately 4 to 5 percent;

fluorides $BaF_2+RFx$, approximately 0.5 to 79 percent; and a dopant over 100%, approximately 0.5 to 10 wt percent of $M_2O_3$ or $MF_3$, with M selected from a group consisting of rare earth elements:

neodymium (Nd), erbium (Er), ytterbium (Yb), thulium (Tm), terbium (Tb), holmium (Ho), samarium (Sm), europium (Eu), praseodymium (Pr); and mixtures thereof;

where R is selected from the group consisting of Ca, Mg, Pb, and Bi;

x is an index representing an amount of fluoride (F) in the compound RFx, forming fluorides selected from the group consisting of $CaF_2$, $MgF_2$, $PbF_2$, and $BiF_3$.

9. The bismuth fluorophosphate glass as set forth in claim 3, further comprising a dopant comprised of an oxide of Mn over 100 wt % from 0.5 to 20 wt percent.

10. The bismuth fluorophosphate glass as set forth in claim 3, further comprising a dopant comprised of an oxide of Mn over 100 wt % from 0.5 to 20 wt percent.

11. The bismuth fluorophosphate glass as set forth in claim 4, further comprising a dopant comprised of an oxide of Mn over 100 wt % from 0.5 to 20 wt percent.

12. The bismuth fluorophosphate glass as set forth in claim 7, further comprising a dopant comprised of an oxide of Mn over 100 wt % from 0.5 to 5 wt percent.

13. The bismuth fluorophosphate glass as set forth in claim 8, further comprising a dopant comprised of an oxide of Mn over 100 wt % from 0.5 to 10 wt percent.

* * * * *